INVENTOR
Brian A. G. Churcher.
BY
Wesley G. Carr
ATTORNEY

Patented Aug. 16, 1932

1,872,243

UNITED STATES PATENT OFFICE

BRIAN ANDREW GRAHAM CHURCHER, OF BOWDEN, ENGLAND, ASSIGNOR TO WESTINGHOUSE ELECTRIC & MANUFACTURING COMPANY, A CORPORATION OF PENNSYLVANIA

ELECTRICAL INDICATING, MEASURING, RELAY AND LIKE ARRANGEMENTS RESPONSIVE TO FREQUENCY

Application filed November 13, 1929, Serial No. 406,869, and in Great Britain November 15, 1928.

My invention relates to mechanism that is responsive to frequency of alternating current circuits and has application to means for measuring or controlling the frequency of an alternating current.

According to the invention a frequency responsive mechanism is provided comprising an instrument operatively connected with a tuned circuit and is selectively sensitive to current therein which is lagging or leading with respect to the voltage across the terminals of said circuit but insensitive to current in said circuit which is in phase with said voltage. The instrument itself may be of the dynamometer or other suitable type and is provided with two windings one of which is connected in series with the resonant circuit and the other of which is connected to be energized from the same source of alternating current by means of a circuit that is rendered predominantly reactive.

When the currents flowing through the two windings of such an instrument are substantially in quadrature with each other, the moving element of the instrument will remain in a neutral or central position, so that when the frequency in the tuned circuit of the moving element is that of resonance the moving element will not be deflected. If, however, the frequency changes from that of resonance the moving element will move in the one direction or in the other direction according to whether the frequency in the source of alternating current is above or below the resonance frequency.

When the frequency rises above that of resonance the inductance of the tuned circuit will in effect predominate and the current through the instrument winding connected in the tuned circuit will lag with respect to the voltage, while, if the frequency falls below that of resonance the capacity of the tuned circuit will in effect predominate and the current through this coil of the instrument will lead the voltage.

Mechanism organized in accordance with my invention may be used for indicating changes in frequency from a predetermined value, such as that of a source of electrical supply, or for measuring the frequency of such a supply, or as a relay for controlling auxiliary circuits, for example, those used to control a pilot motor for adjusting the speed of a prime mover driving an alternator.

Figure 1:
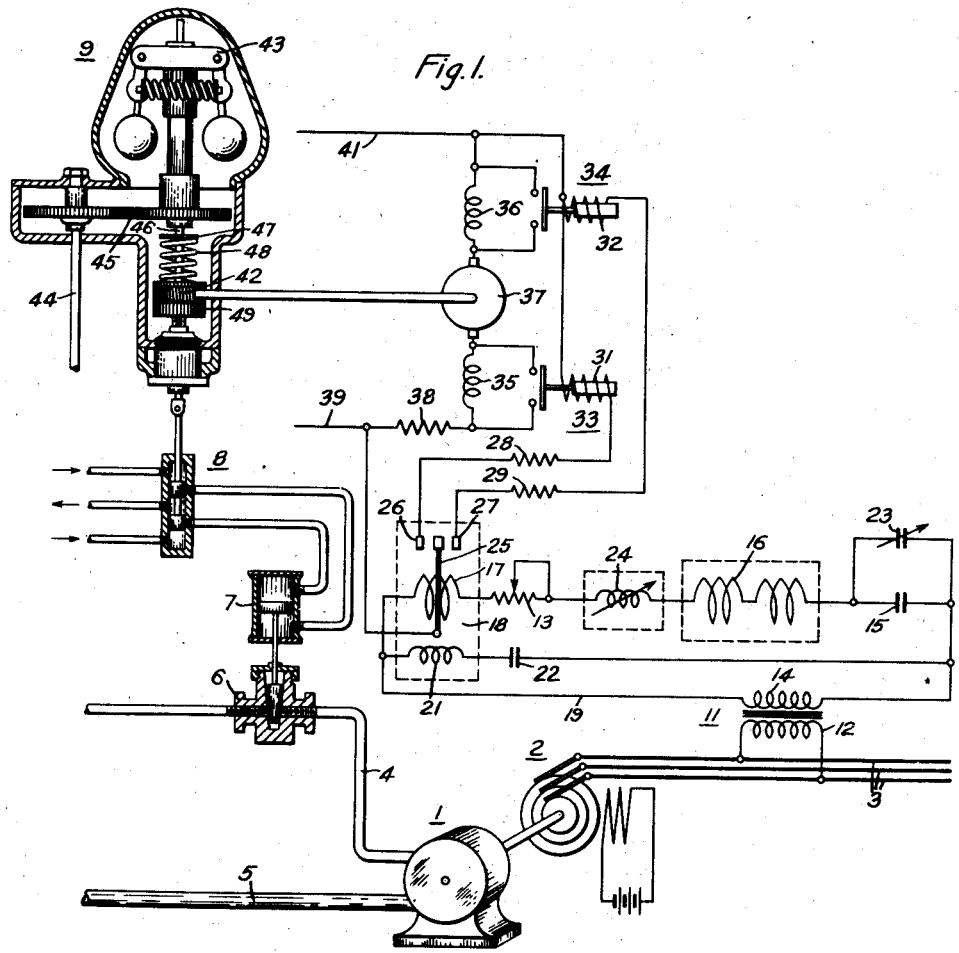
Figure 2:
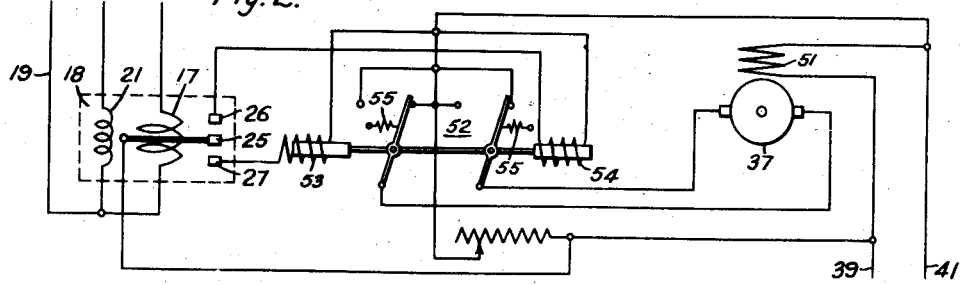
Figure 3:
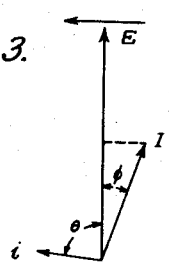

Fig. 1 is a diagrammatic showing of a system embodying the invention, Fig. 2 is a showing of a modification, and Fig. 3 is a vector diagram showing the relation between the applied voltage, the current in winding 21, and the current in the resonant circuit shown in Fig. 1.

Referring to Figure 1 of the drawing, a prime mover 1 is illustrated as driving an alternator 2 for supplying power to an alternating current circuit comprising the conductors 3. The prime mover is provided with a supply pipe 4 and an exhaust pipe 5 by means of which a motive fluid is supplied to, and lead from, the prime mover. An inlet valve 6 is provided in the supply pipe 4 and is connected to be actuated by a cylinder 7 in accordance with the movements of a pilot valve 8, that is actuated in accordance with the speed of the prime mover 1 by the governor mechanism 9.

A transformer 11 is provided having a primary winding 12 that is connected to the circuit 3 the frequency of which is to be maintained constant. The secondary winding 14 of the transformer 11 is connected through a series resonant circuit, comprising a fixed condenser 15 and an inductance 16, to the current winding 17 of a dynamometer type instrument 18, and, by means of a conductor 19, to the other side of the secondary winding 14 of the transformer. The secondary winding 14 is also connected to supply a circuit through the winding 21 of the instrument 18 which is made predominantly reactive by means of a fixed condenser 22 of large capacity, or by means of a reactor connected in series circuit relation with the winding 21.

For the purpose of finally adjusting the circuit of the winding 17 of the instrument, a variable condenser 23 may be connected in parallel with the fixed condenser 15 or a variable inductor 24 may be connected in series circuit relation with the main inductance 16, the latter being preferably astatically wound so that the adjustment of the resonant circuit will not be disturbed by magnetic fields. A variable resistor 13 is preferably included in the circuit above described to permit adjustment of the sensitivity of the arrangement, that is, the sharpness of the tuning to the resonant frequency.

The instrument or relay 18 may be of the moving coil or other suitable type. When the instrument 18 is used for relay purposes it is preferably designed for an increasing torque per unit of angular deflection from its central position with the object of attaining adequate pressure between the relay contact members. The working field of such a relay is preferably so proportioned that a rapid increase of torque will occur before the moving contact member engages a fixed contact member in order to obtain a positive engagement of these members.

With the frequency responsive arrangement above described, the moving element 25 of the instrument 18 will move to the one side or the other of the central position when the frequency of the current in the circuit 3 rises above or falls below its normal value. This will be understood by reference to Fig. 3 in which E is the applied voltage, $i$ is the current in the winding 21 of the instrument 18 which leads the voltage E by an angle $\theta$ which is substantially 90°. The current I in the resonant circuit will lag or lead the voltage E by an angle $\phi$ according to whether the frequency is above or below the normal value.

The moving contact member 25 of the relay 18 is adapted to engage the one or the other of the relay contact members 26 or 27 which are connected, respectively, through resistances 28 and 29 to the windings 31 and 32 of the reversing switches 33 and 34. The reversing switches 33 and 34 are so arranged that when their operating windings are de-energized, they will short-circuit the portions 35 and 36, respectively, of a split field winding of the motor 37, which is connected through a resistor 38 to supply circuit conductors 39 and 41. With the arrangement described the motor 37 will be caused to rotate in the one or in the other direction if the frequency of the main circuit 3 rises above or falls below the normal value and actuate a worm gear 42 for changing the governor setting.

Any well known form of governor mechanism may be used to control the operation of the prime mover, the illustrated form being used for description purposes only. The governor mechanism comprises a centrifugal device 43 that is operated in accordance with the speed of the prime mover 1 as transmitted from the prime mover through a shaft 44 and a gear mechanism 45.

The speed varying movements of the device is communicated to a rod 46 having a collar 47 secured thereto. Bearing against the collar 47 is one end of a coil spring 48 the other end of which fits within a hollow worm gear wheel 49. The gear wheel 49 is adjusted by the operation of the pilot motor 37 through the worm gear 42 to vary the tension of the spring 48 and the setting of the governor mechanism. Adjustments of the gear wheel 49 increase or decrease the tension of the spring 48 and thereby regulates the setting of the governor mechanism. The rod 46 is connected to the piston of the pilot valve 8 to control the flow of liquid to the upper or lower portion of the pressure cylinder 7 and thereby correspondingly actuate the inlet valve 6.

Referring to Figure 2 of the drawing an arrangement is shown in which the governor motor 37 is not of the split field type. The motor is provided with a field winding 51 that is shown connected to the conductors 39 and 41. The direction of operation of the motor is controlled by a double-pole, double-throw reversing switch 52 which may be moved from one contact making position to another contact making position by means of windings 53 and 54, the energization of which is controlled by the contact making relay or instrument 18. Biasing members 55 are provided for normally maintaining the movable switch contact members in a neutral or open circuit position when both of the windings 53 and 54 are de-energized.

With the arrangement above described it will be appreciated that the governor adjustment can be changed quickly enough to respond to changes in frequency but that owing to rotational inertia and the consequent time lag which must ensue before the frequency is brought back to normal, the change in the governor setting may be more than required for the desired correction in which case the frequency alteration may be over-corrected thus causing hunting or oscillation above and below the normal frequency value. To avoid such oscillation, an anti-hunting device may be applied. Further, the relay may be so designed that momentary fluctuations in frequency are ignored.

Various modifications of the circuits and apparatus used to illustrate my invention may be made without departing from the spirit thereof and I do not wish to be limited otherwise than by the scope of the appended claims.

I claim as my invention:

1. In a frequency control system, a prime mover and an alternating current generator driven thereby, a governor for controlling the speed of the prime mover, and means for varying the setting of the governor comprising a contact making relay having two windings arranged to actuate said relay in the one or the other direction in accordance with the variation from quadrature of the currents flowing therein, and means for varying the phase relation between the currents in said windings in accordance with the variation in the frequency of said generator from a predetermined value.

2. In a frequency control system, a prime mover and an alternating current generator driven thereby, means for controlling the speed of said prime mover comprising a contact making relay having two windings arranged to actuate said relay in the one or in the other direction in accordance with the variation from quadrature of the currents flowing therein. a tuned circuit for connecting one of said windings to be energized in accordance with the frequency of said alternator, and a highly reactive circuit for connecting the other of said windings to be energized in accordance with the frequency of said alternator.

3. In a frequency control system, a prime mover and an alternating current generator driven thereby, means for controlling the speed of said prime mover comprising a contact making relay having two windings arranged to actuate said relay in the one or in the other direction in accordance with the variation from quadrature of the currents flowing therein, means for rendering one of said circuits predominantly reactive, and means for rendering the other circuit selectively sensitive to current therein which is leading or lagging with respect to the voltage across the terminals of the circuit but insensitive to current in said circuit which is in phase with said voltage, and means for energizing said circuits from said alternator.

In testimony whereof, I have hereunto subscribed my name this 24th day of October, 1929.

BRIAN ANDREW GRAHAM CHURCHER.